Figure 1:
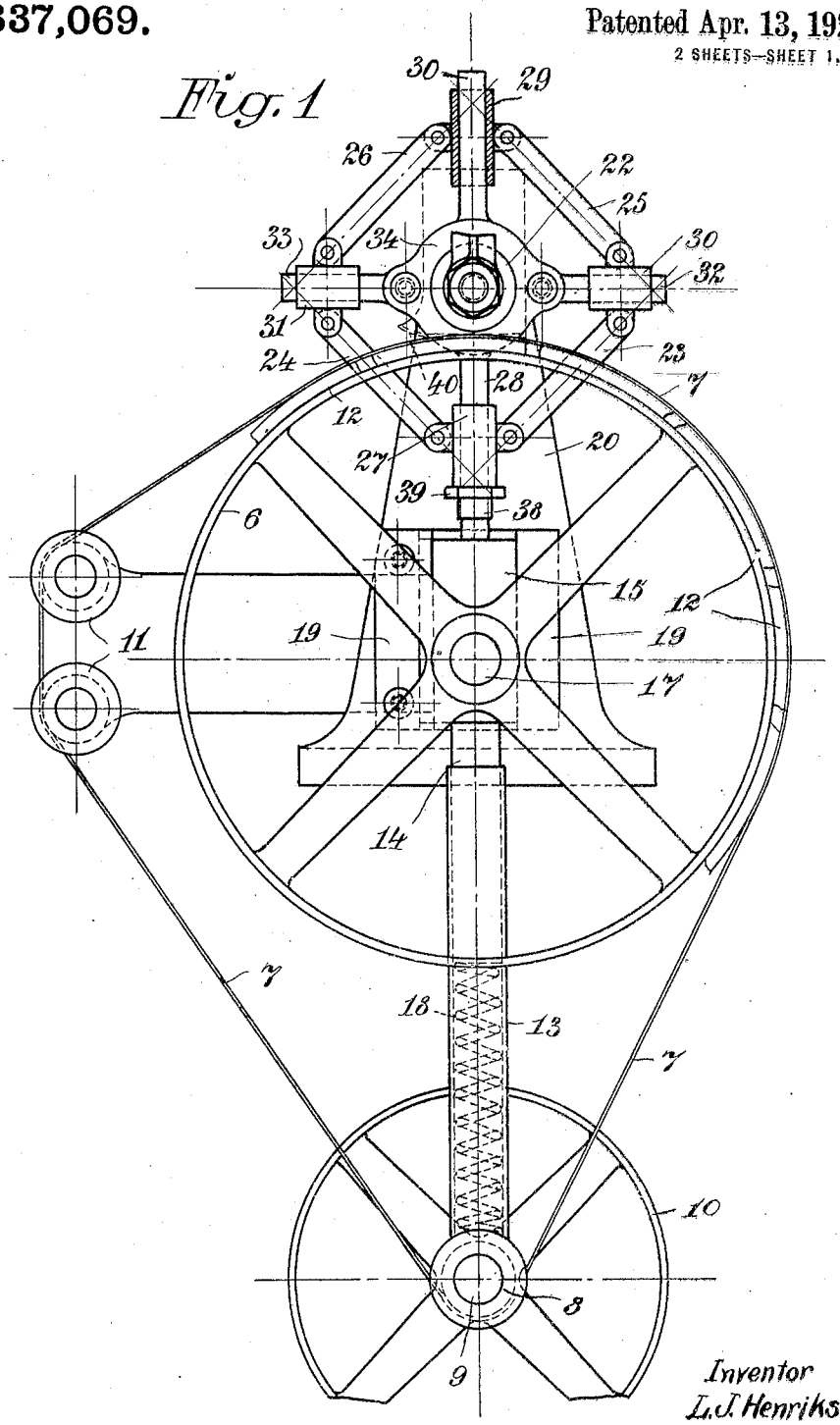

L. J. HENRIKSEN.
MACHINE FOR JOINING OF PIECES OF LEATHER.
APPLICATION FILED SEPT. 16, 1919.

1,337,069.

Patented Apr. 13, 1920.
2 SHEETS—SHEET 1.

Inventor
L. J. Henriksen
By
Attorney

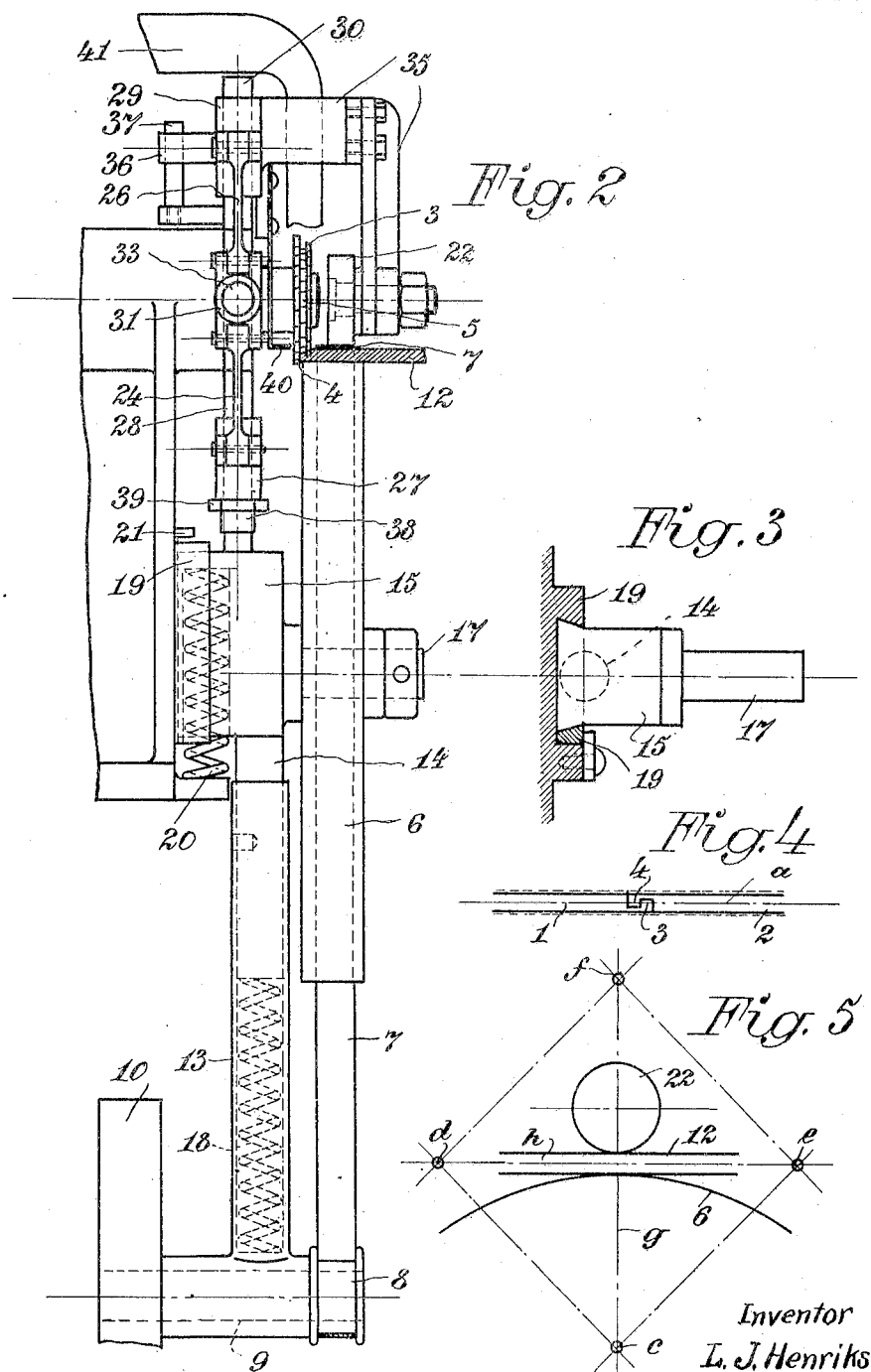

UNITED STATES PATENT OFFICE.

LARS JÖRGEN HENRIKSEN, OF KÄFLINGE, SWEDEN.

MACHINE FOR JOINING OF PIECES OF LEATHER.

1,337,069.      Specification of Letters Patent.      Patented Apr. 13, 1920.

Application filed September 16, 1919. Serial No. 324,250.

*To all whom it may concern:*

Be it known that I, LARS JÖRGEN HENRIKSEN, a citizen of Sweden, residing at Käflinge, in the county of Malmöhus, Sweden, have invented new and useful Improvements in Machines for Joining of Pieces of Leather, of which the following is a specification.

This invention relates to a machine for joining of pieces of leather, whereby the joining is carried out in such a way that small pieces of leather at a smaller distance from their edges are provided with a groove whereby a lip is formed at the edge having about the same breadth as the groove, whereafter two such pieces are put together and pressed together in such a way that the lips enter into the grooves. In this way a labyrinth joint is formed, the strength and tightness of which is dependent on the accuracy with which the groove and the lip is carried out, and therefore the exact cutting out of these parts is very important for obtaining a good result. The manner of producing a joint in this way is already known and thus the present invention does not include the joint itself but only a machine for making the grooves in such a way, that the joint becomes as tight and durable as possible and that the feeding of the work pieces and the regulating of the machine in accordance with each of these takes place automatically and without fault. In this way the machine will give the greatest possible output and it may be attended to by anybody without any special competence.

The invention is illustrated in the accompanying drawings, in which Figure 1 is a front view of the machine. Fig. 2 is a side view of the same, and Fig. 3 shows a part of the machine. Fig. 4 shows an end view of a ready joint, and Fig. 5 is a diagram of the guide members for the work pieces.

As shown in Fig. 4, the joint is made by providing two pieces of leather 1 and 2 at a smaller distance from the edge with grooves in such a way that lips 3 and 4 are formed at the edges, said lips being introduced in the grooves in such a way that the pieces are united by a labyrinth joint. For carrying out a joint of this kind a machine is needed that partly cuts the edges of the leather pieces in such a way that they become straight and partly at a proper distance from the straight edges cuts the groove.

For this purpose an eventually divided milling cutter (Fig. 2) is used according to the invention, consisting of two outer parts 3 and 4, of which the former is adapted for cutting the groove and the latter for cutting the edge straight, and a central part 5 between said outer parts for cutting the remaining lip to a suitable height. Of the three parts of the milling cutter the central part 5 has the smallest diameter and the part 3 a somewhat larger diameter. The difference between the diameters corresponds to the height of the lip above the bottom of the groove. As shown in Fig. 4, the groove is cut down to about two thirds of the thickness of the leather and the lip faced off to about one third thereof, and thus two pieces of the same thickness will be in one and the same plane after joining. The diameter of the portion 4 of the cutter may vary, but it ought to be greater than the two other parts and of such a size that it will be able completely to cut through pieces of leather also of a considerable thickness in the manner described hereinafter.

For the feeding of the pieces of leather into the machine a feeding wheel 6 is provided and an endless belt or suitably a flexible steel band 7 running over the same. This belt runs also over a pulley 8 on a shaft 9 carrying a driving wheel 10 for the feed belt. The belt is also drawn out to one side over one or suitably two guide pulleys 11 (Fig. 1) in such a way that pieces 12 of leather may be put in between the belt 7 and the pulley 6 as shown in the drawing. The pieces of leather thus jammed in are carried with the pulley 6 when the latter is brought into rotation by means of the driving wheel 10 and the pulley 8, and pass the cutter 3—5, which performs the edge and groove cutting. The prepared pieces fall down, when the belt 7 again leaves the pulley 6, and are collected in a trough or the like (not shown) by which they are carried to one side and prevented from coming into contact with the pulley 8. In order to be able to stretch the belt 7 according to the different number of pieces of leather present between the belt and the pulley, the shaft 9 is carried by a sleeve 13 which is made to slide telescopically on a bar 14 serving as guide and firmly connected with a cross piece 15 carrying the shaft 17 of the pulley Between the bottom of the sleeve 13 and the end of the bar 14 a pressure spring 18 is provided which tends to separate the shafts 9 and 17 from each other and thereby keeps the belt 7 pressed against the pulley 6 by nearly constant pressure independently of the number of pieces of leather jammed between them. It is evident that the construction described for the stretching of the belt is only to be considered as an example, as it may be modified in many different ways.

The cross piece 15 is made to slide from and to the spindle of the cutter in guides 19 provided on the frame of the machine; the form of which in other respects is independent of the invention (see also Fig. 3), and it is acted upon by a weight or a spring 20 tending to press the shaft 17 nearer to the cutter spindle (Fig. 2), but its movement toward this is limited by means of a projection or the like 21 in such a way that the cutter never can come into contact with the pulley, which is provided with peripheral grooves or the like in order to prevent a piece of leather pressed against the pulley by means of the belt 7 from sliding to one side.

Above the cross piece 15 a parallelogram is provided acting upon a pressure roller 22 arranged over the pulley 6 and resting against the belt 7 about opposite to the cutter 3—5. This parallelogram effects that a movement upward of the pulley causes the pressure roller to move downward an equal distance, or vice versa, and, though such a movement also may be brought about in some other way, for instance by means of a rack that follows the movements of the cross piece and is in engagement with a pinion rotatorily mounted on a fixed shaft, said pinion also being in engagement with another rack acting upon the pressure roller, or by means of a suitable lever system, etc., the form shown in the drawing is to be preferred.

The parallelogram consists of four links 23, 24, 25 and 26, of which 23 and 24 at one end are pivotally connected with each other by means of a sleeve 27 made to slide on a guide bar 28. The links 25 and 26 are in the same way pivotally connected with a sleeve 29 made to slide on a guide bar 30 in the prolongation of the guide bar 28. The links 23, 25 and 24, 26 are also pivotally connected with sleeves 51 and 31 made to slide on guide bars 32 and 33 placed in line with each other. The guide bars 28 and 30 cross the guide bars 32 and 33 at right angles in a fixed central member 34 (Fig. 1), and at the upper sleeve 29, which is connected with an arm 35 serving as a support for the pressure roller 22, an eye 36 is provided inclosing and guided by a fixed pin 37 (Fig. 2) in such a way that a rotation of the sleeve 29, the arm 35 and the pressure roller 22 around the guide bar 30 is excluded. The sleeve 27 rests against the cross piece 15 with an adjustable member 38 (a screw), which can be secured by a lock nut 39.

The device described is to be used for an automatic adjustment of the cutting depth of the cutter according as the pieces of leather fed into the machine are thicker or thinner. As shown in Fig. 4, the groove and the lip ought to be placed on a certain depth in relation to a central plane ($a$ in Fig. 4) through the leather in order to get the two pieces of leather to lie in one plane after the joining, i. e. so that the upper surface of the lip is situated just as much above said plane as the bottom of the groove is under the same, and thus it is evident that the cutting depth ought to be adjusted in relation to the thickness of the leather. When the cutter is not exchanged for each different thickness of leather, it is necessary to change the position of the pieces of leather in relation to the cutter spindle, i. e. they must be brought nearer to or be separated from said spindle in such a way that the central plane always is at a constant distance from the same. In Fig. 5 the points $c$, $d$, $e$ and $f$ indicate the four sleeves 27, 31, 51 and 29, and the lines $g$ and $h$ indicate the four guides 28, 30 and 32, 33 crossing each other in a fixed point preferably on the theoretical axis of the cutter. The movements of the pressure roller 22 are uniform with the movements of the point $f$, and the movements of the feeding wheel 6 are in the same way uniform with the movements of the point $c$. If the piece of leather 12 is brought between the roller 22 and the wheel 6, these will be pressed away from each other as much as the thickness of the piece of leather (plus the thickness of the belt 7, though this is of no consequence, as it may be considered as constant), but at this the pulley 6 moves downward on account of the parallelogram just as much as the pressure roller moves upward. If the line $h$ represents the central plane of the pieces of leather it will be easily understood that this always is in one and the same position irrespective of the movements of the pressure roller and the pulley. Said central plane lies really, as shown in the drawing, somewhat under the crossing point of the guide bars, but this has of course no influence on the result. The central plane can however be raised or lowered in relation to the cutter spindle by means of the adjusting screw 38. If this screw is raised or lowered the pulley 6 alone will be raised or lowered correspondingly. The said possibility of adjustment serves as an after adjustment of the cutting depth, if the parts of the cutter in grinding have obtained a somewhat reduced diameter.

In cutting the edges of the pieces of leather straight loose pieces are formed which are fully cut away by the part 4 of the cutter. In order to prevent that these loose pieces cause break-downs they must be kept down during the cutting, and for this purpose a member 40 is provided at the side of the cutter opposite to the pressure roller 22, which member is connected with the sleeve 29 carrying the pressure roller in such a way that it will be moved uniformly with the pressure roller in relation to the wheel 6. The end of the member 40 first struck by the pieces of leather is bent a little upward, as shown in Fig. 1 so as to help the pieces to slide under the same. For the rest said member stretches outward to both sides of the cutter and its working face is at a distance from the circumference of the wheel 6 that is so much smaller than the distance of the pressure wheel 22 from the wheel 6 as the thickness of the belt 7. As the member 40 follows all the movements of the pressure roller, it is evident that it will always rest against the upper side of the pieces of leather facing the pressure wheel.

When the machine is working the pieces of leather are continually fed between the belt 7 and the pulley 6 and carried up against the cutter as the pulley rotates. When the pieces are fed into the machine it must be seen to that they project a sufficient distance toward the cutter in such a way that they may be cut straight at the edge, and then the groove and the lip will be automatically placed in their proper positions and obtain their proper depth or height. A suction pipe 41 connected with a fan may be used for removing the chips.

What I claim as new is:

1. A machine for joining pieces of leather by means of grooves cut near the edge of said pieces and lips at the edges fitting into said grooves, consisting of a milling cutter having a profile corresponding to both the groove and the lip and a rotating feeding wheel over which an endless belt is passed between which and the wheel the pieces of leather are introduced and carried toward the cutter at the rotation of the wheel.

2. A machine comprising a milling cutter having a profile corresponding to a groove and a lip in the work piece, a rotating feeding wheel over which an endless belt is passed between which and the wheel pieces of leather are fed to the cutter, said belt passing also over guide rollers one of which is acted upon by a spring for the purpose of stretching the belt.

3. A machine comprising a milling cutter having a profile corresponding to a groove and a lip in the work piece, a rotating feeding wheel over which an endless belt is passed between which and the wheel pieces of leather are fed to the cutter, said cutter being provided with a separate portion of larger diameter for cutting the edge of the work piece straight.

4. A machine comprising a milling cutter having a profile corresponding to a groove and a lip in the work piece, a rotating feeding wheel over which an endless belt is passed between which and the wheel pieces of leather are fed to the cutter, said feeding wheel being made to slide to and from the cutting part of the cutter and constantly pressed toward the latter, and a pressure roller resting against the belt and connected with the feeding wheel in such a way that it is made to slide toward and from the cutter at the same time as the feeding wheel.

5. A machine comprising a milling cutter having a profile corresponding to a groove and a lip in the work piece, a rotating feeding wheel over which an endless belt is passed between which and the wheel pieces of leather are fed to the cutter, said feeding wheel being mounted in a cross piece acted upon by a spring and made to slide to and from the cutter spindle, and a parallelogram consisting of two double links being arranged between the cross-head and a pressure roller resting against the belt, the four pivotal corners of said parallelogram being guided by guide rods which are arranged crosswise in such a way that one of the pivotal corners of the parallelogram is connected with the pressure roller and controls its movements, and the opposite corner rests against the cross head and is acted upon by the movement of the latter.

6. A machine comprising a milling cutter having a profile corresponding to a groove and a lip in the work piece, a rotating feeding wheel over which an endless belt is passed between which and the wheel pieces of leather are fed to the cutter, said feeding wheel being mounted in a cross piece acted upon by a spring and made to slide to and from the cutter spindle, and a parallelogram consisting of two double links being arranged between the cross-head and a pressure roller resting against the belt, the corner of the parallelogram carried by the cross-head resting against the same by means of an adjustable screw provided with a lock nut.

7. A machine comprising a milling cutter having a profile corresponding to a groove and a lip in the work piece, a rotating feeding wheel over which an endless belt is passed between which and the wheel pieces of leather are fed to the cutter, said feeding wheel being mounted in a cross piece acted upon by a spring and made to slide to and from the cutter spindle, and a parallelogram consisting of two double links being arranged between the cross-head and a pressure roller resting against the belt, the corner of the parallelogram connected with the pressure roller being provided with an eye coacting with a fixed guide pin for preventing the pressure roller from rotating around the guide bar of said corner.

8. A machine comprising a milling cutter having a profile corresponding to a groove and a lip in the work piece, a rotating feeding wheel over which an endless belt is passed between which and the wheel pieces of leather are fed to the cutter, said feeding wheel being mounted in a cross piece connected with a guide bar made to slide in a sleeve that carries a guide roller over which the belt runs, a spring for stretching of the belt being placed between the guide bar and the bottom of the sleeve.

9. A machine comprising a milling cutter having a profile corresponding to a groove and a lip in the work piece, a rotating feeding wheel over which an endless belt is passed between which and the wheel pieces of leather are fed to the cutter, said feeding wheel being mounted in a cross piece connected with a guide bar made to slide in a sleeve that carries a guide roller over which the belt runs, a spring for stretching of the belt being placed between the guide bar and the bottom of the sleeve, a driving wheel being mounted on the shaft of said guide roller.

10. A machine comprising a milling cutter having a profile corresponding to a groove and a lip in the work piece, a rotating feeding wheel over which an endless belt is passed between which and the wheel pieces of leather are fed to the cutter, said feeding wheel being mounted in a cross piece acted upon by a spring and made to slide to and from the cutter spindle, and a parallelogram consisting of two double links being arranged between the cross-head and a pressure roller resting against the belt, a projecting member being arranged on the side of the cutter opposite to the pressure roller, said member being connected with the moving mechanism of the pressure roller in such a way that the projecting member is moved uniformly with the roller in relation to the feeding wheel and that the under side of the projecting member facing the feeding wheel is placed so much nearer to the circumference of the feeding wheel than the pressure roller as the thickness of the belt.

In testimony whereof, I have signed my name to this specification in the presence of two subscribing witnesses.

LARS JÖRGEN HENRIKSEN.

Witnesses:
    HJ. BRANZELL,
    GUNHILD PETERSSON.